(12) United States Patent
Padovitz et al.

(10) Patent No.: US 9,234,765 B1
(45) Date of Patent: Jan. 12, 2016

(54) DISCOVERING THEME AND ATTRIBUTE ORIENTED TRAVEL ROUTES AND RELEVANT GEOGRAPHIC ENTITIES ALONG A ROUTE

(71) Applicant: Google Inc., Mountain View, CA (US)

(72) Inventors: Amir Padovitz, Redmond, WA (US); Akshay N. Java, Kirkland, WA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/283,417

(22) Filed: May 21, 2014

Related U.S. Application Data

(60) Provisional application No. 61/831,390, filed on Jun. 5, 2013.

(51) Int. Cl.
*G01C 21/00* (2006.01)
*G01C 21/36* (2006.01)
*G01C 21/32* (2006.01)
*G01C 21/20* (2006.01)
*G09B 29/10* (2006.01)

(52) U.S. Cl.
CPC .......... *G01C 21/3617* (2013.01); *G01C 21/32* (2013.01); *G01C 21/20* (2013.01); *G09B 29/10* (2013.01)

(58) Field of Classification Search
CPC ........ G01C 21/20; G01C 21/32; G09B 29/10; Y10S 707/99945
USPC ............. 701/28, 36, 425, 438, 409, 533, 461; 707/737, 748
See application file for complete search history.

(56) References Cited

U.S. PATENT DOCUMENTS

| | | |
|---|---|---|
| 6,282,489 B1 | 8/2001 | Bellesfield et al. |
| 6,498,982 B2 | 12/2002 | Bellesfield et al. |
| 6,622,087 B2 | 9/2003 | Anderson |
| 7,054,743 B1 | 5/2006 | Smith |
| 7,194,357 B2 | 3/2007 | Smith |
| 7,324,896 B1 | 1/2008 | Smith |
| 7,599,792 B1 | 10/2009 | Smith |
| 8,095,303 B1 | 1/2012 | Nesbitt et al. |
| 8,275,546 B2 | 9/2012 | Xiao et al. |

(Continued)

FOREIGN PATENT DOCUMENTS

EP        1 955 211        12/2011

*Primary Examiner* — Gertrude Arthur Jeanglaude
(74) *Attorney, Agent, or Firm* — Johnson, Marcou & Isaacs, LLC

(57) ABSTRACT

Methods, systems, and apparatus include computer programs encoded on a computer-readable storage medium, including a method for determining routes. Starting and destination points, and any user constraints, are identified for travel. Initial routes are determined between the starting and destination points. Each initial route is segmented into segments. Attribute oriented routes are determined using the segments. Entities associated with each segment are determined. Attributes are identified for each entity and are aggregated and ranked along all the determined initial routes, and emerging attributes are determined. Attribute oriented routes are determined based on the emerging attributes including: identifying a theme for an attribute oriented route, identifying a set of entities from the determined entities that are associated with the emerging attributes, and creating the attribute oriented route that passes through a region that includes the entities. At least one attribute oriented route and information related to the theme are provided.

22 Claims, 4 Drawing Sheets

(56) References Cited

U.S. PATENT DOCUMENTS

| | | |
|---|---|---|
| 8,335,990 B2 | 12/2012 | Arrasvuori |
| 8,401,786 B2 | 3/2013 | Poppen et al. |
| 8,417,446 B2 * | 4/2013 | Mays ............................ 701/409 |
| 2003/0210825 A1 * | 11/2003 | Friederich et al. ............ 382/246 |
| 2004/0073362 A1 * | 4/2004 | Fabian et al. .................. 701/210 |
| 2007/0219706 A1 | 9/2007 | Sheynblat |
| 2007/0244632 A1 * | 10/2007 | Mueller et al. ................. 701/202 |
| 2010/0299065 A1 * | 11/2010 | Mays ............................ 701/209 |

\* cited by examiner

DISCOVERING THEME AND ATTRIBUTE ORIENTED TRAVEL ROUTES AND RELEVANT GEOGRAPHIC ENTITIES ALONG A ROUTE

CROSS-REFERENCE TO RELATED APPLICATION

This application claims priority to U.S. Provisional Application No. 61/831,390, filed on Jun. 5, 2013. The disclosure of the prior application is considered part of and is incorporated by reference in the disclosure of this application.

BACKGROUND

An application, such as a map application can provide a route between a starting point and a destination point that is designated by a user. Conventional map applications can provide the user with options regarding available routes, such as options relating to tolls or types of roads (i.e., freeways only), and a user can be presented a route that satisfies designated options or other default constraints associated with the map applications.

SUMMARY

In general, one innovative aspect of the subject matter described in this specification can be implemented in methods that include a computer-implemented method for determining routes. The method includes identifying a starting point and a destination point for travel by a user including any constraints of the user regarding the travel. The method further includes determining one or more initial routes between the starting point and the destination point. The method further includes for each initial route, segmenting the route into a plurality of segments based on one or more criteria and determining attribute oriented routes using the segments. The method further includes determining one or more entities associated with each segment and identifying attributes for each determined entity. The method further includes aggregating and ranking the attributes along all the determined initial routes and determining one or more emerging attributes. Determining one or more attribute oriented routes based on the emerging attributes can include identifying a theme for an attribute oriented route based on one or more of the emerging attributes, identifying a set of entities from the determined entities that are associated with the one or more emerging attributes, and creating the attribute oriented route that passes through a region that includes the set of entities. The method further includes providing at least one attribute oriented route and information related to the theme to a device associated with the user.

These and other implementations can each optionally include one or more of the following features. Identifying can include receiving the starting point, destination point and constraints, and the constraints can include limitations that affect a choice of the attribute oriented route. Determining the one or more initial routes can further include determining a plurality of direct routes between the starting point and the destination point. The one or more criteria can include a distance criterion, and segmenting can include segmenting the route into plural substantially equal segments. The one or more criteria can include a function, and a segment can be a length equal to the function applied to a respective route. Segmenting the route can further include locating one or more intermediary points along the route in accordance with the criteria, each intermediary point representing an end of one segment and a beginning of a new segment, and determining one or more entities that are in proximity to each segment can further include for each intermediary point, determining one or more entities in an area around a given intermediary point. Determining one or more entities in an area can include determining one or more entities in a radius around the intermediary point. Determining the entities in an area can include performing a geographical search around starting and end points for each segment. Aggregating and ranking the attributes along all the determined routes and determining one or more emerging attributes can further include accumulating the attributes, evaluating the accumulated attributes to determine top attributes for entities along the determined routes, and identifying the emerging attributes from the determined top attributes. Determining one or more attribute oriented routes can include scoring a region based on matching emerging attributes of the region as compared to one or more goals and determining routes within an area that maximize an aggregate rank based on the scoring under the constraints. The method can further include identifying regions along the determined routes based on the emerging attributes. The area can be a bounding area within which attribute oriented routes are selected. The one or more goals can define a set of optimization goals, and the method can further include receiving the set of optimization goals from the user or deriving the set of optimization goals from a profile associated with the user. The method can further include optimizing routes in, eliminating routes from, the one or more attributed oriented routes based the constraints provided by the user. The constraints can include a total maximum travel time between the starting point and destination point. Determining one or more attribute oriented routes can further include searching the attribute oriented routes for one that passes through regions with highest aggregate scores for a set of selected attributes of the emerging attributes. A theme can be based on a set of emerging attributes.

In general, another innovative aspect of the subject matter described in this specification can be implemented in computer program products that include a computer program product tangibly embodied in a computer-readable storage device and comprising instructions. The instructions, when executed by one or more processors, cause the processor to: identify a starting point and a destination point for travel by a user including any constraints of the user regarding the travel; determine one or more initial routes between the starting point and the destination point; for each initial route, segment the route into a plurality of segments based on one or more criteria; and determine attribute oriented routes using the segments including: determine one or more entities associated with each segment; identify attributes for each determined entity; aggregate and rank the attributes along all the determined initial routes and determining one or more emerging attributes; determine one or more attribute oriented routes based on the emerging attributes including identifying a theme for an attribute oriented route based on one or more of the emerging attributes, identifying a set of entities from the determined entities that are associated with the one or more emerging attributes, and creating the attribute oriented route that passes through a region that includes the set of entities; and provide at least one attribute oriented route and information related to the theme to a device associated with the user.

These and other implementations can each optionally include one or more of the following features. Identifying can include receiving the starting point, destination point and constraints, and the constraints can include limitations that affect a choice of the attribute oriented route.

In general, another innovative aspect of the subject matter described in this specification can be implemented in systems, including a system comprising one or more processors and one or more memory elements including instructions. The instructions, when executed, cause the one or more processors to: identify a starting point and a destination point for travel by a user including any constraints of the user regarding the travel; determine one or more initial routes between the starting point and the destination point; for each initial route, segment the route into a plurality of segments based on one or more criteria; and determine attribute oriented routes using the segments including: determine one or more entities associated with each segment; identify attributes for each determined entity; aggregate and rank the attributes along all the determined initial routes and determining one or more emerging attributes; determine one or more attribute oriented routes based on the emerging attributes including identifying a theme for an attribute oriented route based on one or more of the emerging attributes, identifying a set of entities from the determined entities that are associated with the one or more emerging attributes, and creating the attribute oriented route that passes through a region that includes the set of entities; and provide at least one attribute oriented route and information related to the theme to a device associated with the user.

Particular implementations may realize none, one or more of the following advantages. A user can be provided with a route that includes features associated with one or more themes that may be of interest to the user.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Systems, methods, and computer program products are described for identifying travel routes, e.g., related to the discovery and recommendation of relevant routes to users and interesting nearby places along routes. For example, identification of routes can occur through the process of optimization, inference and ranking of geographic entities and their attributes along a route. Systems, methods, and computer program products for identifying travel routes can equally apply to different modes of transportation along a route, such as, without limitation, driving or walking. Selection and recommendation of routes can also be based on criteria through a process of optimization.

Conventional systems, for example, may deal with ways to optimize some cost of finding points of interest along a route, or finding points of interest near the route, or the inverse, namely, methods to generate routes given a list of points of interest. This disclosure deals with a different problem, which is—without any predetermined set of points of interest, identifying routes that possess certain attributes or themes. Given a departure location and final destination, for example, routes can be discovered that are associated with certain themes, such as routes going through wineries. Such themes or attributes can emerge from the geography and can also be optionally matched with a goal set of input attributes.

In some implementations, identifying travel routes can enable discovery of interesting routes and enable reasoning, ranking and understanding of entities along or within some distance from routes. Such entities can be drawn, for example, from a wide range of place types, including but not limited to businesses, events, geographical regions such as populated places, parks or neighborhoods, etc.

In some implementations, routes can be discovered and recommended based both on emergent attributes—discovered through the process of inference—for which routes may be interesting to users, as well as based on users providing selection criteria and constraints.

In some implementations, identifying travel routes can have applications in other areas, such as any area that uses and/or can be enhanced by discovering and recommending routes to users or other computer systems and applications, such as in travel, web search, social networks and local search, among others.

Figure 1:
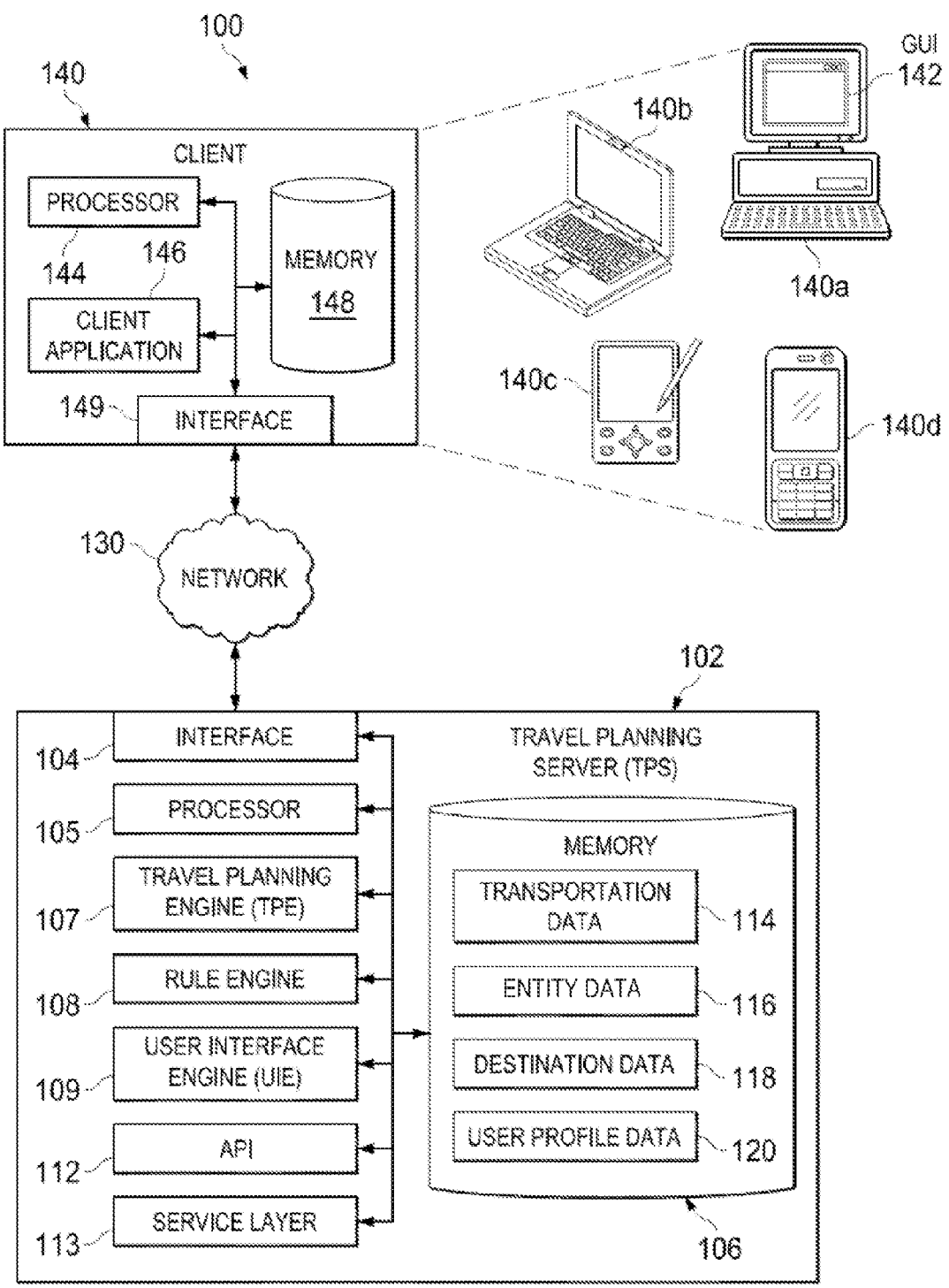
FIG. 1 is a block diagram illustrating an example travel planning system for determining travel routes.

FIG. 1 is a block diagram illustrating an example travel planning computer system 100 for determining travel routes. The travel planning computer system (TCPS) 100 includes or is communicably coupled with a travel planning server (TPS) 102 and at least one client 140 that communicate across a network 130.

At a high level, the TPS 102 is an electronic computing device operable to receive, transmit, process, store, or manage data and information associated with the TPCS 100 using a GUI 142 providing a TPCS 100 user (hereinafter "user") with an efficient, user-friendly, and secure presentation of data provided by or communicated within the TPCS 100. Specifically, the TPS 102 provides various integrated tools and associated functionality, for example, through a particular graphical user interface (GUI) used to compare, among other things, routes, attribute oriented routes, geographical features, themes, or the like by selecting, defining, editing, and/or confirming choices for components that make up a particular travel experience.

The TPS 102 is responsible for receiving application requests, for example route planning requests, e.g., including requests for an attribute oriented route, described below with reference to FIGS. 2-3. For example, requests can be received from one or more client applications 146 associated with a particular client 140 of the TPCS 100 and responding to the received requests by processing the received vacation planning requests in a travel planning engine (TPE) 107, rule engine 108, and/or user interface engine (UIE) 109, and sending an appropriate response back to the requesting client application 146. In addition to requests from the client 140, requests associated with a particular TPE 107, rule engine 108, and/or UIE 109 may also be sent from internal users, external or third-party users, other automated applications (not illustrated), as well as any other appropriate entities, individuals, systems, or computers associated with the TPS 102 and/or other components of the TPCS 100. In some implementations, the TPS 102 may also include or be communicably coupled with an e-mail server, a web server, a caching server, a streaming data server, and/or other suitable server.

At least a portion of the TPE 107, rule engine 108, and/or UIE 109 is executed using requests/responses sent from/to a client 140 within and communicably coupled to the illustrated TPCS 100 using network 130. In some implementations, requests/responses can be sent directly to TPS 102 from a user accessing TPS 102 directly. In some implementations, the TPS 102 may store a plurality of TPE 107, rule engine 108, and/or UIE 109 instances. In some implementations, the TPS 102 may comprise a web server, where one or more of the components of TPS 102 represent web-based applications accessed and executed by the client 140 using the network 130 or directly at the TPS 102 to perform the programmed tasks or operations of the various components of the TPS 102.

In some implementations, any and/or all of components of the TPS 102, both hardware and/or software, may interface with each other and/or an interface 104 (described below) using an application programming interface (API) 112 and/or a service layer 113. The API 112 may include specifications for routines, data structures, and object classes. The API 112 may be either computer language-independent or -dependent and refer to a complete interface, a single function, or even a set of APIs. The service layer 113 provides software services to the TPCS 100. The functionality of the TPS 102 may be accessible for all service consumers using this service layer. Software services provide reusable, defined business functionalities through a defined interface. For example, the interface may be software written in JAVA, C++, or other suitable language providing data in extensible markup language (XML) format or other suitable format.

While illustrated as an integrated component of the TPS 102 in the TPCS 100, alternative implementations may include the API 112 and/or service layer 113 as a stand-alone component in relation to other components of the TPCS 100. Moreover, any or all parts of the API 112 and/or service layer 113 may be implemented as a child or sub-modules of another software module, enterprise application, or hardware module without departing from the scope of this disclosure.

The TPS 102 includes an interface 104. Although illustrated as a single interface 104 in FIG. 1, two or more interfaces 104 may be used according to particular needs, desires, or particular implementations of the TPCS 100. The interface 104 is used by the TPS 102 for communicating with other systems in a distributed environment—including within the TPCS 100—connected to the network 130; for example, the client 140 as well as other systems (not illustrated) communicably coupled to the network 130. Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the TPCS 100.

The TPS 102 includes a processor 105. Although illustrated as a single processor 105 in FIG. 1, two or more processors may be used according to particular needs, desires, or particular implementations of the TPCS 100. Generally, the processor 105 executes instructions and manipulates data to perform the operations of the TPS 102. Specifically, the processor 105 executes the functionality required to determine attribute oriented routes for travel.

The TPS 102 also includes a memory 106 that holds data for the TPS 102. Although illustrated as a single memory 106 in FIG. 1, two or more memories may be used according to particular needs, desires, or particular implementations of the TPCS 100. While memory 106 is illustrated as an integral component of the TPS 102, in alternative implementations, memory 106 can be external to the TPS 102 and/or the TPCS 100. In some implementations, the memory 106 holds/manages the description and/or data for all objects in the TPS 102, includes one or more instances of transportation data 114, entity data 116, destination data 118, and/or user profile data 120.

The transportation data 114 is data identifying available forms of transportation associated with various components of a trip. For example, in some implementations, the transportation data 114 can be associated with air carriers, trains, boats/ships, subways, taxi service, bus service, shuttle services, and the like.

In some implementations, the transportation data 114 is accessed by the TPE 107 and/or the rule engine 108. For example, the TPE 107 and/or the rule engine 108 can access, analyze, and/or process the transportation data 114, and subsequently use the UIE 109 to display appropriate results to a user using a particular client application 146, e.g., an application that displays travel routes based at least in part on user inputs. In some implementations, the transportation data 114 can be accessed by a remote access system or software, a local or remote client 140, or other suitable TPCS 100 component.

In some implementations, the TPE 107 can perform functions used for identifying attribute oriented routes. For example, the TPE 107 can identify initial routes that connect a user-provided starting point to a user-provided destination point. The TPE 107 can segment each of the determined initial routes into segments having, for example, a predetermined length. The TPE 107 can construct plural attribute oriented routes using the segments and identify one or more entities for each of the segments. The TPE 107 can identify attributes, such as "Beach" and "winery," as attributes in regions that include the determined segments, and aggregate and rank the attributes that correspond to each of the initial routes. The TPE 107 can produce or identify a set of attribute related routes from the segments, and each attribute related route can be based on plural attributes (e.g., wineries) that are associated with entities (e.g., specific wineries) associated a given theme. The TPE 107 can select at least one attribute oriented route for presentation to the user. The route(s) chosen, for example, can include the route having or being in proximity to the entities that have the most attributes that are perceived to be of interest to the user.

The entity data 116 is data identifying entities associated with geographical regions. For example, in some implementations, the entity data 116 can be associated with towns, cities, landmarks or other geographic features. Entity data can include local attractions and/or any other suitable data with respect to a geographic region, such as tourism information, physical features, events, activities or other attributes associated with a specific entity.

In some implementations, the entity data 116 is accessed by the TPE 107 and/or the rule engine 108. For example, the TPE 107 and/or the rule engine 108 can access, analyze, and/or process the entity data 116, and subsequently use the UIE 109 to display appropriate results to a user using a particular client application 146. In some implementations, the entity data 116 can be accessed by a remote access system or software, a local or remote client 140, or other suitable TPCS 100 component. In some implementations, the rule engine 108 can be used, e.g., by the TPE 107, to access and use rules for identifying attribute oriented routes based on rules for selecting routes from segments that are associated with particular attributes (e.g., because of their proximity to a given geographical feature or entity). The rules, for example, can identify maximum distances to add to a route in order to include a particular entity for consideration when determining an attribute oriented route. Other rules for generating attribute oriented routes are possible.

The destination data 118 is a specific subset of the entity data identifying available destinations. For example, in some implementations, the destination data 118 can be associated with geographic regions, countries, cities, towns, and the like. For example, for a particular city, the destination data 118 may include and/or indicate where to access name, geographic coordinates, population, demographics, weather data, major highways, available airports, train stations, bus stops, location industry, location attractions, special events, tax rates, laws, history, and/or any other suitable data with respect to a given city.

In some implementations, the destination data 118 is accessed by the TPE 107 and/or the rule engine 108. For example, the TPE 107 and/or the rule engine 108 can access, analyze, and/or process the destination data 118, and subsequently use the UIE 109 to display appropriate results to a user using a particular client application 146. In some implementations, the destination data 118 can be accessed by a remote access system or software, a local or remote client 140, or other suitable TPCS 100 component. For example, after segmentation of initial routes, a destination in proximity to a segment end can be identified. The destination data 118 can be used to locate entities in proximity to the destination. Segmentation and entity location is discussed in greater detail below.

The user profile data 120 is data associated with a particular user and/or group of users. In some implementations, the user profile data 120 may include, for example, name, address, identification number (such as a U.S. Social Security Number), age, birthdate, place of birth, nationality, race, religion, sex, marital status, relationship status, education level, employer, interests, travel history, prior TPCS 100 system choices made, data about friends and/or acquaintances, and other suitable user profile data. In one example, the user profile data 120 could be used by the TPE 107, rule engine 108, and or UIE 109 to make proposals to a user about potential routes. If a user indicated in past TPCS 100 transactions that they prefer beaches and mountain destinations, the TPCS 100 could provide current beach and mountain routes with a higher weighting in deciding which routes to present to a user. In some implementations, the user profile data 120 can also be used to filter and/or recommend routes. For example, a married female planning a vacation may be presented with "romantic" type routes. In some implementations, user profile date 120 can include preferences and/or other inputs by the user, e.g., input in the GUI 142, that indicate specific user interests (e.g., scenic drives, French restaurants, wine, max distance to drive, etc.). User preferences, for example, can be used as constraints when generating suggested routes.

In some implementations, the user profile data 120 can be, among other things, updated, edited, and/or deleted by a suitable component of the TPCS 100, such as the TPE 107 and/or client application 146. These operations can take place whether or not the user is accessing TPCS 100. For example, the user can update their user profile data 120 using the client application 146 and/or based on travel actions/choices made by other users in a user's demographic group, the user profile data 100 can be updated to indicate a greater likelihood for the user to select certain travel. A particular user's choices made using client application 146 can also result in the user profile data 120 for the particular user being modified in some way.

In some implementations, the user profile data 120 is accessed by the TPE 107 and/or the rule engine 108. For example, the TPE 107 and/or the rule engine 108 can access, analyze, and/or process the user profile data 120, and subsequently use the UIE 109 to display appropriate results to a user using a particular client application 146. In some implementations, the user profile data 120 can be accessed by a remote access system or software, a local or remote client 140, or other suitable TPCS 100 component.

The travel planning engine (TPE) 107 can be any application, program, module, process, or other software that may provide methods/functionality for, among other things, providing route-related component data to display; analyzing and processing user input provided by the UIE 109; providing instructions to the UIE 109; interfacing with the rule engine 108 to determine allowable/desirable routes or combinations thereof and attending data related thereto (such as travel time on a given route); requesting, analyzing/processing and displaying third-party route data; and other services (such a travel planning or vacation planning services). The TPE 107 can also filter available component data (e.g., entity data and destination data) based upon, for example, user selections, the user profile data 120, and/or other suitable data, to present more personalized/contextually appropriate data to a particular user. In these instances, the TPE 107 can provide methods/ functionality to recommend (e.g., assign a higher weighting value) particular routes based on user selections, the user profile data 120, and/or other suitable data. In some implementations, the TPE 107 can interface with the rule engine 108, UIE 109, and/or the client application 146, as appropriate, to provide filtering, weighting, proposals, and/or other suitable functionality.

Although illustrated as a single TPE 107 in the TPS 102, two or more TPEs 107 may be used in the TPS 102 according to particular needs, desires, or particular implementations of the specific environment. In some implementations, the TPE 107 can access, process, and/or modify data associated with the transportation data 114, entity data 116, destination data 118, user profile data 120, and/or other suitable data.

In some implementations, a particular TPE 107 can operate in response to and in connection with at least one request received from an associated client 140. Additionally, the particular TPE 107 may operate in response to and in connection with at least one request received from other TPEs 107, including TPEs 107 associated with other TPSs 102. In some implementations, each TPE 107 can represent a web-based application accessed and executed by one or more remote clients 140 across the network 130 (e.g., through the Internet, or using at least one cloud-based service associated with the TPE 107). For example, part of a particular TPE 107 may be a web-based service associated with a TPE 107 that is remotely called, while another part of the particular TPE 107 may be an interface object or agent bundled for processing at a remote client 140. Moreover, any or all of a particular TPE 107 may be a child or sub-module of another software module (not illustrated). Still further, parts of the particular TPE 107 may be executed or accessed by a user working directly at the TPS 102, as well as remotely at a corresponding client 140. In some implementations, the transportation data 114, entity data 116, destination data 118, and/or user profile data 120 can be defined with and stored within the TPE 107, as opposed to memory 106.

The rule engine 108 can be any application, program, module, process, or other software that may provide methods to evaluate and/or execute a rule instance (not illustrated) to support, among other things, calculating routes, ranking routes, ranking regions, and other operations for, filtering, displaying, and/or selecting a theme, emerging attributes, and/or optimizing a route. In some implementations, the rule engine 108 can interface with the TPE 107, UIE 109, and/or the client application 146, as appropriate, to provide described functionality.

The above-mentioned rule instance may represent conditions, parameters, variables, algorithms, instructions, constraints, references, and any other appropriate information for determining allowable/suggested/desirable routes to a user. For example, the rule instance may specify that selecting a particular city to be included in a particular route assists in satisfying one or more goals associated with a user.

Although illustrated as a single rule engine 108 in the TPS 102, two or more rule engines 108 may be used in the TPS 102 according to particular needs, desires, or particular implementations of the specific environment. In some implementations, the rule engine 108 can access, process, and/or modify data associated with the transportation data 114, entity data 116, destination data 118, user profile data 120, and/or other suitable data.

In some implementations, a particular rule engine 108 can operate in response to and in connection with at least one request received from an associated client 140. Additionally, the particular rule engine 108 may operate in response to and in connection with at least one request received from other rule engines 108, including rule engines 108 associated with other TPSes 102. In some implementations, each rule engine 108 can represent a web-based application accessed and executed by one or more remote clients 140 across the network 130 (e.g., through the Internet, or using at least one cloud-based service associated with the rule engine 108). For example, part of a particular rule engine 108 may be a web-based service associated with a rule engine 108 that is remotely called, while another part of the particular rule engine 108 may be an interface object or agent bundled for processing at a remote client 140. Moreover, any or all of a particular rule engine 108 may be a child or sub-module of another software module (not illustrated). Still further, parts of the particular rule engine 108 may be executed or accessed by a user working directly at the TPS 102, as well as remotely at a corresponding client 140. In some implementations, the transportation data 114, entity data 116, destination data 118, and/or user profile data 120 can be defined with and stored within the rule engine 108, as opposed to memory 106.

The user interface engine (UIE) 109 can be any application, program, module, process, or other software that may provide a travel planning GUI environment, for example, a GUI displayed using a client 140. Other implementations consistent with this disclosure are envisioned and the provided figures are in no way intended to limit the scope of a particular GUI environment provided by the UIE 109. In some implementations, a format of the GUI, displayed data, and/or other characteristics associated with the GUI can be determined from the user profile data 120 and/or other suitable data. For example, a user may prefer that displayed images are no smaller than a defined minimum dimension. The UIE 109 can then display and modify other GUI elements as necessary to meet the user's request. The UIE 109 can also modifies the GUI based upon user selections. For example, if a user selects a specific city, the UIE 109 can change the GUI to display specific information about the selected city. In some implementations, the UIE 109 can interface with the TPE 107, the rule engine 108, and/or the client application 146, as appropriate, to provide described functionality.

Although illustrated as a single UIE 109 in the TPS 102, two or more UIEs 109 may be used in the TPS 102 according to particular needs, desires, or particular implementations of the specific environment. In some implementations, the UIE 109 can access, process, and/or modify data associated with the transportation data 114, entity data 116, destination data 118, user profile data 120, and/or other suitable data.

A particular UIE 109 may operate in response to and in connection with at least one request received from other UIEs 109, including a UIE 109 associated with another TPS 102, as well as other components of the TPCS 100. In some implementations, the UIE 109 can be and/or include a web server. In some implementations, each UIE 109 can represent a network-based application accessed and executed using the network 130 (e.g., through the Internet, or using at least one cloud-based service associated with the UIE 109). For example, a portion of a particular UIE 109 may be a Web service associated with the UIE 109 that is remotely called, while another portion of the UIE 109 may be an interface object or agent bundled for processing at a remote client 140. Moreover, any or all of a particular UIE 109 may be a child or sub-module of another software module or enterprise application (not illustrated) without departing from the scope of this disclosure. Still further, portions of the particular UIE 109 may be executed or accessed by a user working directly at the TPS 102, as well as remotely at a corresponding client 140.

The TPCS 100 also includes a client 140. The client 140 may be any computing device operable to connect to or communicate with the TPS 102 using the network 130. In general, the client 140 comprises an electronic device operable to receive, transmit, process, present and store any appropriate data associated with the TPCS 100.

The illustrated client 140 further includes a client application 146. The client application 146 is any type of application that allows the client 140 to request, view, edit, and or delete content on the client 140 as well as to interact with the client 140. In some implementations, the client application 146 can be and/or include a web browser. In some implementations, the client-application 146 can use parameters, metadata, and other information received at launch to access a particular set of data, applications, etc. from the TPS 102. Once a particular client application 146 is launched, a user may interactively process a task, event, or other information associated with the TPS 102, including, among other things, evaluating routes by selecting, defining, editing, and/or confirming choices for components that make up a route. Further, although illustrated as a single client application 146, the client application 146 may be implemented as multiple client applications in the client 140.

The illustrated client 140 is intended to encompass any computing device such as a desktop computer 140*a*, laptop/notebook computer 140*b*, wireless data port, smart phone 140*d*, personal data assistant (PDA), tablet computing device 140*c*, one or more processors within these devices, or any other suitable processing device. For example, the client 140 may comprise a computer that includes a camera; an input device, such as a keypad, touch screen, or other device that can accept user information; and an output device that conveys information associated with the operation of the TPS 102 or the client 140 itself, including digital data, visual information, or a GUI 142, as shown with respect to the client 140.

The illustrated client 140 further includes an interface 149, a processor 144, and a memory 148. The interface 149 is used by the client 140 for communicating with other systems in a distributed environment—including within the TPCS 100—connected to the network 130; for example, the TPS 102, as well as other systems (not illustrated) communicably coupled to the network 130. The interface 149 may also be consistent with the above-described interface 104 of the TPS 102 and/or other interfaces within the TPCS 100. The processor 144 may be consistent with the above-described processor 105 of the TPS 102 and/or other processors within the TPCS 100. Specifically, the processor 144 executes instructions and manipulates data to perform the operations of the client 140, including the functionality required to send requests to the TPS 102 and to receive and process respective responses. The memory 148 may be consistent with the above-described memory 106 of the TPS 102 and/or other memories within the TPCS 100, but storing objects and/or data associated with the purposes of the client 140. Memory 148 may also be used by the TPS 102 and/or other component (not illustrated) of the TPCS 100 to store any type of data for the purposes of the client 140 or of the storing component.

Further, the illustrated client 140 includes a GUI 142. The GUI 142 interfaces with at least a portion of the TPCS 100 for any suitable purpose, including generating a visual representation in a web browser. The GUI 142 may be used to view and navigate various internal/external web pages associated with the TPS 102 as well as to interact with all provided GUIs, data, and/or functions associated with comparing and presenting routes. In some implementations, the client application 146 may act as a GUI interface for the TPS 102, for example, a particular user interface generated by the UIE 109. In some implementations, the TPS 102 and/or other components of the TPCS 100 can transmit executable components to the client application 146 for analysis and execution on the client 140, for example, GUI code and/or data-gathering code, and/or provide content to the client application 146 for display, for example, the changing cost of a travel destination based upon a specifically selected vacation component value(s).

There may be any number of clients 140 associated with, or external to, the TPCS 100. For example, while the illustrated TPCS 100 includes one client 140 communicably coupled to the TPS 102 using network 130, alternative implementations of the TPCS 100 may include any number of clients 140 suitable to the purposes of the TPCS 100. Additionally, there may also be one or more additional clients 140 external to the illustrated portion of the TPCS 100 that are capable of interacting with the TPCS 100 using the network 130. Further, the term "client" and "user" may be used interchangeably as appropriate, without departing from the scope of this disclosure. Moreover, while the client 140 is described in terms of being used by a single user, this disclosure contemplates that many users may use one computer, or that one user may use multiple computers.

Figure 2:
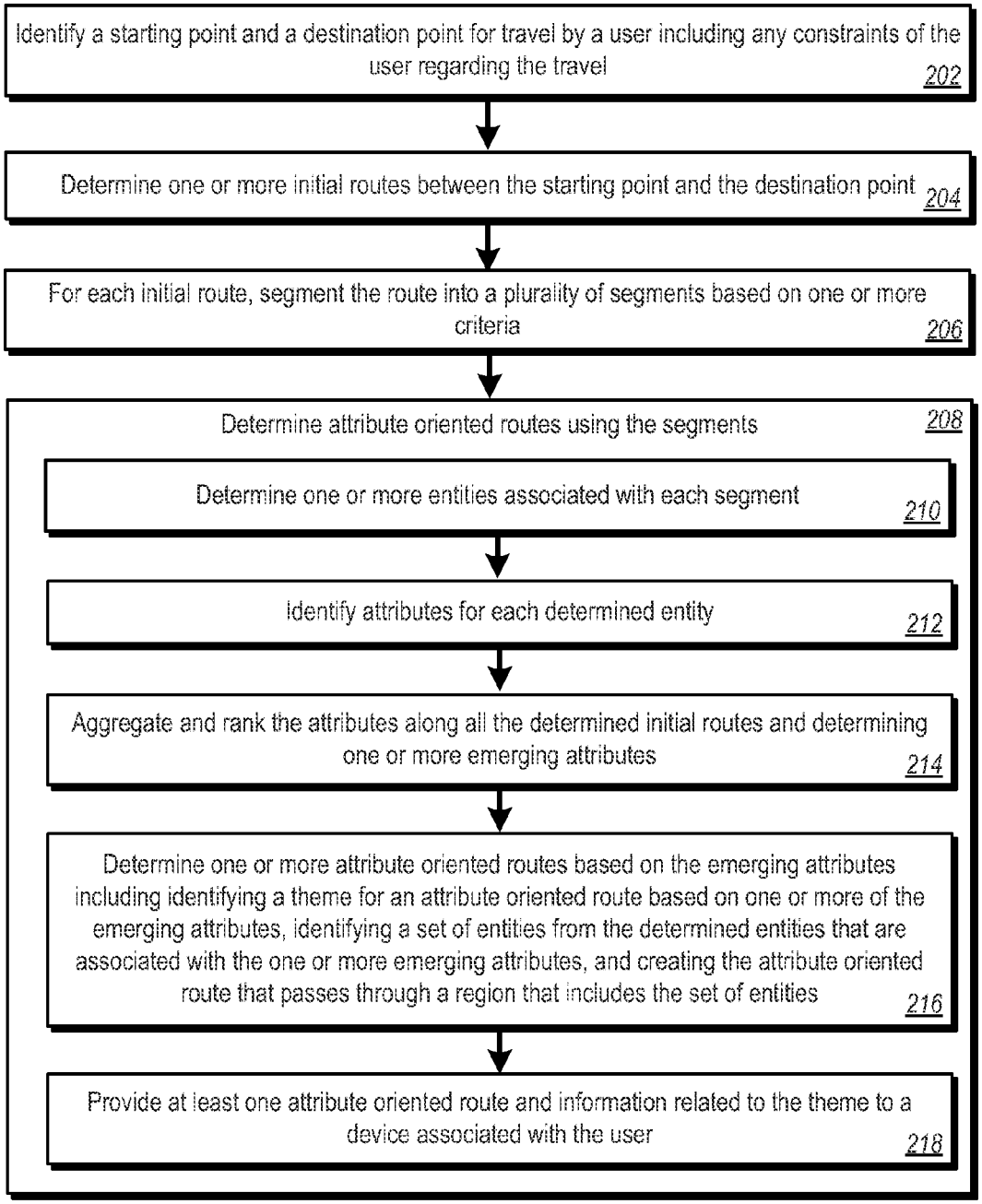
FIG. 2 is a flowchart of an example process 200 for identifying attribute oriented routes.

FIG. 2 is a flowchart of an example process 200 for identifying attribute oriented routes. In some implementations, the TPS 102 can perform steps of the process 200 using instructions that are executed by one or more processors. FIGS. 1 and 3 are used to provide example structures for performing the steps of the process 200.

A starting point and a destination point are identified for travel by a user, including any constraints of the user regarding the travel (202). For example, a user using the GUI 142 or some other interface can identify a starting point 302 and a destination point 304, e.g., as described below with reference to FIG. 3. In some implementations, start and end points for routes can be provided through a web form or a text input box. Further, additional user inputs, such as constraints, can be specified through various input methods including free-form text, queries, sliders for indicating the distance from the route, check boxes and/or radio buttons to indicate preferences, and other input methods.

In some implementations, identifying the starting point and destination point can include receiving the starting point, destination point and constraints (e.g., from the GUI 142), and the constraints can include limitations that affect a choice of the attribute oriented route. For example, user input in the GUI 142 can include constraints that the overall route is to be five hours or shorter. Other constraints are possible.

One or more initial routes are determined between the starting point and the destination point (204). For example, the TPE 107 can identify initial routes that connect the starting point 302 and the destination point 304.

In some implementations, determining the one or more initial routes can further include determining a plurality of direct routes between the starting point and the destination point. For example, routes identified by the TPE 107 can include routes that are identified solely on the basis of geographic considerations associated with distance and time. Other factors, such as weather conditions and road construction, can also be considered.

For each initial route, the route is segmented into a plurality of segments based on one or more criteria (206). As an example, the TPE 107 can break each of the determined initial routes into segments, where each segment is of a certain length, as described below with reference to FIG. 3. Other factors, in addition to or in combination with length, can be used in segmenting a route, such as topology, road type/condition, and other factors.

In some implementations, the one or more criteria can include a distance criterion, and segmenting can include segmenting the route into plural substantially equal segments. For example, the criteria may include a maximum distance (e.g., 200 miles) or a maximum time for a route, as specified by the user, and segmenting by the TPE 107 can including segmenting each route into segments having a certain length (e.g., 50 miles). Segments can also be determined based on time, such as depending on speed limits on the segments, and/or other factors. Other criteria used in segmenting can include, for example, kid-friendliness, scenic quality (e.g., is the segment scenic), terrain features (e.g., is the segment along the coast or in a valley), and other criteria.

In some implementations, the one or more criteria can include a function, and a segment can be a length equal to the function applied to a respective route. For example, a function used by the TPE 107 can be a function that segments a route into equal portions (e.g., F=D/4 where a 200 mile route would be divided into 4 substantially equal 50-mile segments). In some implementations, segmenting the route can further include locating one or more intermediary points along the route in accordance with the criteria, each intermediary point representing an end of one segment and a beginning of a new segment. As will be discussed in greater detail below, for each intermediary point, one or more entities in an area around a given intermediary point can be determined in order to develop attribute oriented routes. For example, the TPE 107 can identify intermediate points, such as via points, that are included in the route. The TPE 107 can also identify specific entities, such as wineries, that are near each of the intermediary points. Segments that are determined in this way may be of differing lengths, e.g., adjusted so that the beginning and/or the ending of each segment is near an entity.

In some implementations, determining one or more entities in an area can include determining one or more entities in a radius around an intermediary point. For example, for an entity to be considered by the TPE 107, the entity may need to be within a radius of N miles or some other distance or time metric. In some implementations, determining the entities in an area includes performing a geographical search around starting and end points for each segment. As an example, the TPE can perform a search for entities (e.g., businesses, attractions, etc.) that are within the defined radius of an end point associated with a segment. Entity identification is discussed in greater detail below.

Attribute oriented routes are determined using the segments (208). In some implementations, step 208 can include the following sub-steps. For example, the TPE 107 can construct plural attribute oriented routes using the segments, as described below with reference to FIG. 3.

One or more entities associated with each segment are determined (210). For example, the TPE 107 can identify one or more entities (e.g., specific coastal wineries) for each of the segments, as described below with reference to FIG. 3. Entities can be of the form of geographical features such as towns, cities, national parks, attractions, museums, shopping malls and stores, natural features (e.g., waterfalls), scenic overlooks, historical sites, restaurants, or other geographic features.

Attributes are identified for each determined entity (212). The TPE 107, for example, can identify attributes, such as "Beach" and "winery" as attributes in regions that include the determined segments, as described below with reference to FIG. 3. Attributes can include attractions, features, reasons for tourism, descriptors for the attractions, features or reasons for tourism or the same. For example, the attributes can correspond to popular and interesting beach towns 306 along the attribute oriented route 12.

The attributes are aggregated and ranked along all the determined initial routes and one or more emerging attributes are determined (214). For example, the TPE 107 can aggregate and rank the attributes that correspond to each of the initial routes, and the TPE 107 can identify patterns of emerging attributes, e.g., based on a large number of wineries in a region. In some implementations, approaches can include aggregation/counting, or approaches can identify the most significant attributes relative to the general popularity of the certain attributes. For example, if certain, most or all tourist locations have a high density of hotels and restaurants, then this might not be sufficient in identifying this attribute as being interesting and/or significant. However, relative to the general popularity of a particular attribute, a beach might be more relevant and would rank higher.

In some implementations, aggregating and ranking the attributes along all the determined routes and determining one or more emerging attributes can further include accumulating the attributes, evaluating the accumulated attributes to determine top attributes for entities along the determined routes, and identifying the emerging attributes from the determined top attributes. For example, the TPE 107 can keep track of a number of attributes (e.g., by subject) along each route, e.g., five attributes related to wine. Based on the numbers of attributes that are related, for example, the TPE 107 can identify emerging attributes, e.g., to identify wine country as an emerging attribute (e.g., if there are several wineries) versus car museums as a non-emerging attribute (e.g., if there is a single car museum).

One or more attribute oriented routes are determined based on the emerging attributes including identifying a theme for an attribute oriented route based on one or more of the emerging attributes, identifying a set of entities from the determined entities that are associated with the one or more emerging attributes, and creating the attribute oriented route that passes through a region that includes the set of entities (216). For example, the TPE 107 can produce a set of attribute related routes (e.g., including the attribute oriented route 12) from the segments, and each attribute oriented route can be based on plural attributes (e.g., wine, food, and culinary attributes being associated with a "wine country" route) that are associated with entities (e.g., specific wineries, restaurants, museums, tours or the like) associated with a particular region. The theme of wine or wine country, for example, can be based on wine being an emerging attribute. In some implementations, some combinations of available segments and attributes may not result in determining any attribute oriented routes, such as if routes and/or segments are too short and/or go through uninhabited regions.

In some implementations, determining one or more attribute oriented routes can include scoring a region based on matching emerging attributes of the region as compared to one or more goals and determining routes within an area (e.g., a bounding area) that maximizes an aggregate rank based on the scoring under the constraints. For example, the TPE 107 can score attribute oriented routes based on the number of emerging attributes discovered for each route, and regions that are include can be scored, e.g., based on the number of emerging attributes that a region contains.

In some implementations, the process 200 can further include identifying regions along the determined routes based on the emerging attributes. For example, the TPE 107 can identify a region between the starting point 302 and the destination point 304, e.g., as a region that is rich in wine related activities.

In some implementations, the one or more goals can define a set of optimization goals, and the method can further comprise receiving the set of optimization goals from the user or deriving the set of optimization goals from a profile associated with the user. For example, the TPE 107 can score regions based on goals (e.g., interests) provided by the user (e.g., using the GUI 142) and/or goals determined or inferred from user profile data 120.

In some implementations, determining the one or more attribute oriented routes can further include searching the attribute oriented routes for one that passes through regions with highest aggregate scores for a set of selected attributes of the emerging attributes. For example, the TPE 107 can identify (e.g., and rank) attribute oriented routes based on scores that represent the highest number of attractions of interest to the user.

At least one attribute oriented route and information related to the theme are provided to a device associated with the user (218). For example, the TPE 107 can select the attribute oriented route 12 for presentation to the user. The theme can for example represent the sum of the emerging attributes that are associated with the selected route. The theme can be specific or be an indicator of a general topic associated with the emerging attributes that are associated with entities in proximity to a selected route.

In some implementations, the process 200 can further include optimizing routes in, or eliminating routes from, the one or more attributed oriented routes based the constraints provided by the user. For example, the TPE 107 can eliminate routes that exceed a length (e.g., in distance or time) that is designated by the user, or some other criteria, e.g., the route exceeds a total travel time, or the route includes a visit to an attraction that exceeds a duration or cost specified by the user. Other criteria for optimizing or eliminating routes can be used. For example, the length or maximum travel time can be constraints that the user specifies, and the algorithm can use these constraints to produce results that satisfy user requirements for route optimization.

Figure 3:
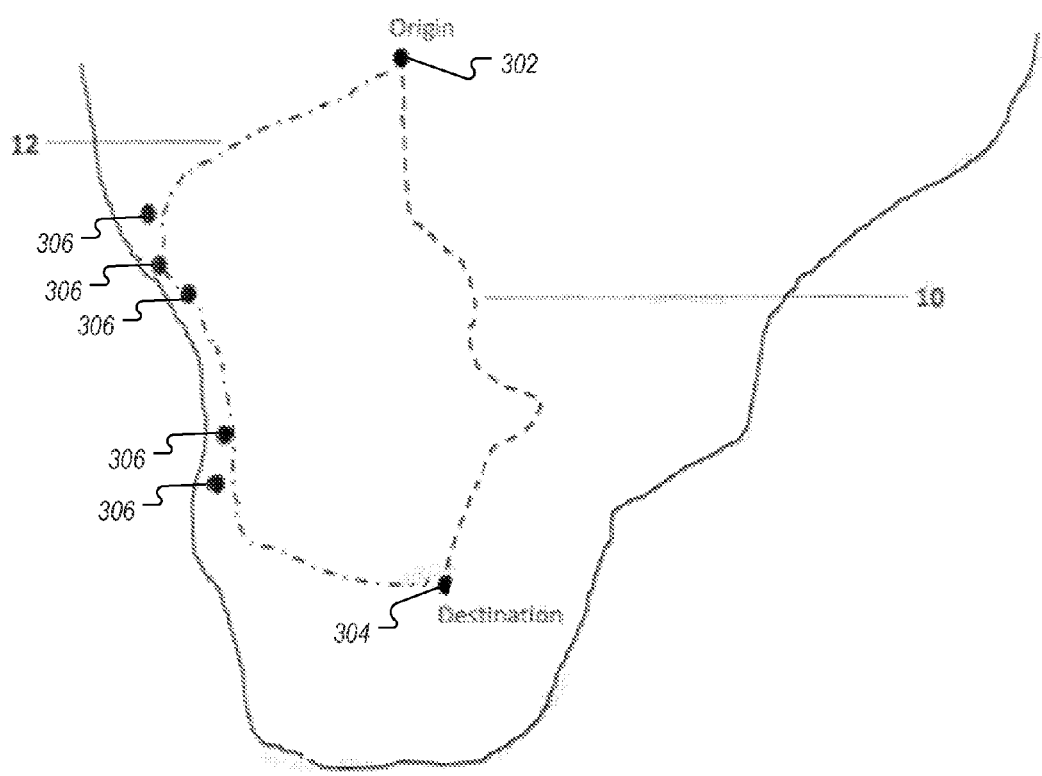
FIG. 3 shows a diagram of an example attribute oriented route determined from initial routes generated by searching geographical entities between a starting point and a destination point.

FIG. 3 is a diagram of an example attribute oriented route 12 determined from initial routes generated by searching geographical entities between a starting point 302 and a destination point 304. For example, given a collection of entities with a position attribute, such as latitude and longitude, the attribute oriented route 12 can represent a route from location A to location B and a distance D. In some implementations, the attribute oriented route 12 can be determined in the following example steps. First, each initial route can be segmented, where each segment of the route is roughly the length of a function f(D). For example, if D is 200 miles and f(D) =D/4, then each segment is roughly 50 miles long. Second, a geographical search is performed around the start and end of each segment with a radius of D to return all entities found. As a result, attribute oriented route 12, for example, can be a best attribute oriented route that exists between the starting point 302 and the destination point 304.

Discovering attribute oriented routes can be based on relevance criteria, optimization constraints and relevant emerging attributes. For example, let C be a set of constraints, let G be the set of optimization goals, and let R be a geographical region. Let A and B represent the origin (e.g., starting point 302) and destination (e.g., destination point 304) for the routes. Let ATTR represent an attribute or set of attributes of a region. Area(A,B) is defined as a function that returns the bounding area within which occurs a search for optimal routes. Rank(R,G) is defined as a function that scores a particular region R based on matching emerging attributes of the region with the optimization goals G. Two steps can be used, for example, to maximize ranks associated with routes. First, for each region R, Rank(R,G) is compared to derive a matching score. Second, a search occurs for routes within Area(A, B) that maximize the aggregate of Rank(R,G) under constraints C. The second step, for example, defines a search optimization function within a bounding area and makes use also of a routing function, allowing the retrieval of navigable route information based on origin, destination and set of "via points" to meet along the route.

Within the space of possible such routes, an optimization can be applied to search for the top routes that maximize the aggregate rank of the regions under constraints. Typically, constraints can define some time limit, maximum number of via points, limit on turns and directions and so on. Any appropriate optimization method can be used to perform this search.

Consider the following example. A user plans to travel between location A and location B and is looking for maximum five-hour-drive excursions that provide relevant experiences along the route. Suppose that the user is interested in scenic drives and is fond of French restaurants. In this example, one of the constraints C is that driving time should be five hours or less. Optimization goals G can include a goal that parts of the suggested route are scenic and a goal that there are French restaurants along the route.

As a result, Rank2(R,G,ATTR), for example, can be defined as a function that scores the set of attributes ATTR of the region R with the optimization goals G. For each region R, Rank2(R,G,ATTR) can be computed to derive a score for each attribute in R. Searching can occur for routes within Area(A,B) that maximize n aggregates of Rank2(R,G, ATTR). That is, routes are searched for within Area(A,B) that have the highest aggregated scores of n selected attributes.

Consider the following example. A user plans to travel between location A and location B. A particular route can be found that goes along the coast near or within several interesting beach towns, and another route can be found that goes through well-known wineries. In this example, "Beach" and "winery" are attributes of regions, which can be scored by Rank2(R,G,ATTR). These routes can be returned or determined, for example, when the aggregates of Rank2(R,G, ATTR="Beach") and Rank2(R,G,ATTR="Winery") "are highest, e.g., compared with the aggregated scores of other attributes, possibly found for other routes.

In another example, a practical extension of the above formal approach can be used, as follows. Given a repository of place data, such as collections of businesses or points of interest or events and so on, the following pre-processing steps can be applied.

Geographic regions can be inferred with regard to some criteria. For example, travel destinations can be inferred based on the density, volume and popularity of places located within the destination. For example, patent application Ser. No. 14/162,596, which is hereby incorporated in its entirety, provides more detail for processes of inferring high level place entities, such as regions and destinations, from lower level places, such as the collection of businesses within a region.

Emerging attributes can be extracted for the inferred regions. Typically, a region can be described by a set of dominant attributes. For example, in a travel application, a destination (e.g., a town) can be described by a set of dominant travel related categories, such as for example, having Latin American Restaurants, a Lake and Wineries. For example, patent application Ser. No. 14/162,596 provides more detail on extracting emergent attributes for geographical regions.

In some implementations, the following algorithm can be used to compute possible routes that are strongly related to particular attributes. For example, the algorithm can be used to identify routes for an origin location A, a destination location B, a mapping service M, and optionally a list of attributes of interest.

First, mapping service M can be used to retrieve routes from location A to location B. For example, a route minimally contains a collection of geographical positions along the route, typically a collection of latitude and longitude position pairs.

Second, for each route, regions of interest are discovered, such as interesting towns, within a distance D form the route. Regions can be located within distance from a route, for example, by segmenting the route, and for each position at the beginning of a segment, retrieving regions of interest that are within D (e.g., using similar techniques as used for discovering regions). For each discovered region, the relevant attributes are retrieved and extracted. Attributes can be aggregated and rank by unity or numerical rank/value to create a value sum of each attribute over entire discovered destinations for a route.

Third, the top n attributes with highest values from aggregated list are selected. At this point, for example, n attributes exist that represent the top emerging attributes nearby a route. For example, attributes such as "Beach," "Winery," and "Great Outdoors," may exist for some routes, e.g., representing important destinations that have such attributes within some distance D from the route.

Fourth, the regions having the top attributes are retrieved. Fifth, routes going through or near the top-attributed regions are retrieved and returned, e.g., using a mapping service.

Referring to FIG. 3, the selection of attribute oriented route 12, e.g., using the algorithm described above, demonstrates the discovery of a route that is different than what a typical GPS system, map application, or direction service provides. For example, a route 10 provided by a GPS or a direction service may be determined using major roads and optimized based on the duration of travel under traffic conditions. Conversely, the attribute oriented route 12 that is determined as described above, shows a travel route going through popular and interesting beach towns 306 along the coast, which emerge from the geography that is within some distance of the origin and destination (e.g., starting point 302 and destination point 304, respectively).

In some implementations, the techniques described above can be used to locate routes based on users' interests. For example, users can look for travel routes that are near wineries or beach towns or national parks, etc., and within constraints such as duration or length of travel.

In some implementations, the techniques described above can be used to generate routes that are associated with emerging attributes in the geography, which are not pre-selected by users, and letting users of the system explore and select routes that are associated with one or more such attributers.

In some implementations, the techniques described above can be used during research and planning phases for discovering and recommending interesting routes and places of interest nearby these routes.

In some implementations, the techniques described above can be used on the go, in a mobile application, via phone or other mobile devices to discover and recommend alternate traveling routes associated with certain themes. In some implementations, alternate routes can be identified dynamically at runtime. For example, if the current route is busy due to high traffic or an accident, an alternate route can either be requested by the user or suggested automatically as a way to show a scenic option or a themed route.

In some implementations, the techniques described above can be included in a discovery service, e.g., through set of APIs to support other computer programs. For example, the service can be used to discover routes associated with emerging or predefined themes or attributes, e.g., given initial inputs of origin and destination.

Figure 4:
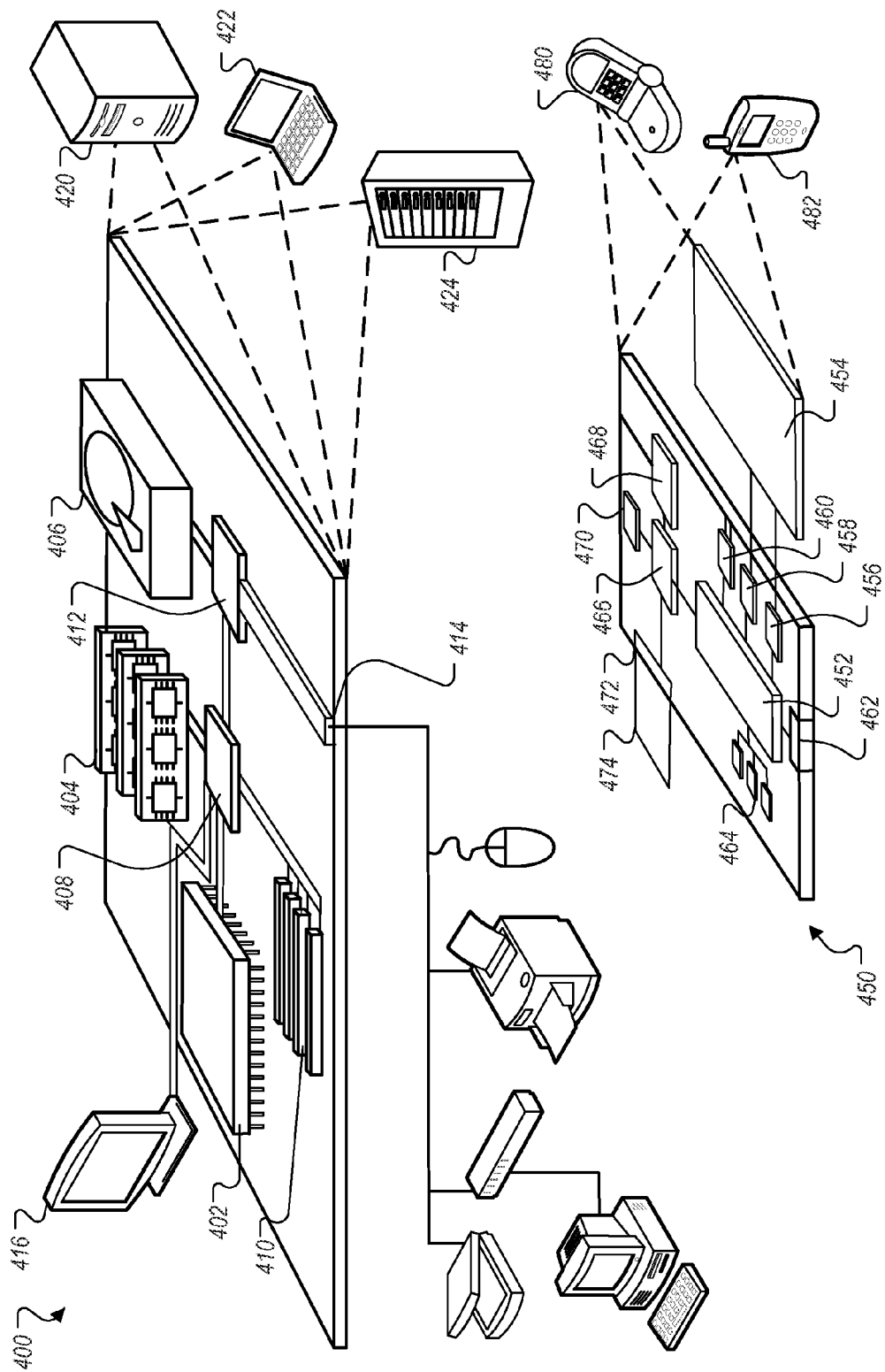
FIG. 4 is a block diagram of an example computer system that can be used to implement the methods, systems and processes described in this disclosure.

FIG. 4 is a block diagram of example computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 400 is further intended to represent any other typically non-mobile devices, such as televisions or other electronic devices with one or more processers embedded therein or attached thereto. Computing device 450 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 400 includes a processor 402, memory 404, a storage device 406, a high-speed controller 408 connecting to memory 404 and high-speed expansion ports 410, and a low-speed controller 412 connecting to low-speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high-speed controller 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high-speed controller 408 manages bandwidth-intensive operations for the computing device 400, while the low-speed controller 412 manages lower bandwidth-intensive operations. Such allocation of duties is an example only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed bus 414. The low-speed bus 414 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as computing device 450. Each of such devices may contain one or more of computing devices 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The computing device 450 may also be provided with a storage device, such as a micro-drive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the computing device 450, such as control of user interfaces, applications run by computing device 450, and wireless communication by computing device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of computing device 450 with other devices. External interface 462 may provide, for example, for wired communication (e.g., via a docking procedure) or for wireless communication (e.g., via Bluetooth® or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to computing device 450 through expansion interface 472, which may include, for example, a subscriber identification module (SIM) card interface. Such expansion memory 474 may provide extra storage space for computing device 450, or may also store applications or other information for computing device 450. Specifically, expansion memory 474 may include instructions to carry out or supplement the processes described above, and may include secure information also. Thus, for example, expansion memory 474 may be provide as a security module for computing device 450, and may be programmed with instructions that permit secure use of computing device 450. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Computing device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 468 (e.g., a radio-frequency transceiver). In addition, short-range communication may occur, such as using a Bluetooth®, WiFi, or other such transceiver (not shown). In addition, GPS receiver module 470 may provide additional wireless data to computing device 450, which may be used as appropriate by applications running on computing device 450.

Computing device 450 may also communicate audibly using audio codec 460, which may receive spoken information from a user and convert it to usable digital information. Audio codec 460 may likewise generate audible sound for a user, such as through a speaker, e.g., in a handset of computing device 450. Such sound may include sound from voice telephone calls, may include recorded sound (e.g., voice messages, music files, etc.) and may also include sound generated by applications operating on computing device 450.

The computing device 450 may be implemented in a number of different forms, as shown in the figure. For example, it may be implemented as a cellular telephone 480. It may also be implemented as part of a smartphone 482, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   identifying a starting point and a destination point for travel by a user including any constraints of the user regarding the travel;
   determining one or more initial routes between the starting point and the destination point;
   for each initial route, segmenting the route into a plurality of segments based on one or more criteria; and
   determining attribute oriented routes using the segments including:
     determining one or more entities associated with each segment;
     identifying attributes for each determined entity;
     aggregating and ranking the attributes along all the determined initial routes and determining one or more emerging attributes;
     determining one or more attribute oriented routes based on the emerging attributes including identifying a theme for an attribute oriented route based on one or more of the emerging attributes, identifying a set of entities from the determined entities that are associated with the one or more emerging attributes, and creating the attribute oriented route that passes through a region that includes the set of entities, wherein determining one or more attribute oriented routes includes scoring a particular region based on matching emerging attributes of the particular region compared to one or more goals and determining routes that maximize an aggregate rank based on the scoring under the constraints; and
   providing at least one attribute oriented route and information related to the theme to a device associated with the user.

2. The method of claim 1 wherein identifying includes receiving the starting point, destination point and constraints, and wherein the constraints include limitations that affect a choice of the attribute oriented route.

3. The method of claim 1 wherein determining the one or more initial routes further includes determining a plurality of direct routes between the starting point and the destination point.

4. The method of claim 1 wherein the one or more criteria is a distance criterion, and wherein segmenting includes segmenting the route into plural substantially equal segments.

5. The method of claim 1 wherein the one or more criteria include a function and a segment is a length equal to the function applied to a respective route.

6. The method of claim 1 wherein segmenting the route further comprises locating one or more intermediary points along the route in accordance with the criteria, each intermediary point representing an end of one segment and a beginning of a new segment, and wherein determining one or more entities that are in proximity to each segment further includes for each intermediary point, determining one or more entities in an area around a given intermediary point.

7. The method of claim 6 wherein determining one or more entities in an area includes determining one or more entities in a radius around the intermediary point.

8. The method of claim 6 wherein determining the entities in an area includes performing a geographical search around starting and end points for each segment.

9. The method of claim 1 wherein aggregating and ranking the attributes along all the determined routes and determining one or more emerging attributes further includes accumulating the attributes, evaluating the accumulated attributes to determine top attributes for entities along the determined routes, and identifying the emerging attributes from the determined top attributes.

10. The method of claim 1 further comprising identifying regions along the determined routes based on the emerging attributes.

11. The method of claim 1 wherein the area is a bounding area within which attribute oriented routes are selected.

12. The method of claim 1 wherein the one or more goals define a set of optimization goals, and wherein the method further comprises receiving the set of optimization goals from the user or deriving the set of optimization goals from a profile associated with the user.

13. The method of claim 1 further comprising optimizing routes in, or eliminating routes from, the one or more attributed oriented routes based on the constraints provided by the user.

14. The method of claim 13 wherein the constraints include a total maximum travel time between the starting point and destination point.

15. The method of claim 1 wherein determining one or more attribute oriented routes further includes searching the attribute oriented routes for one that passes through regions with highest aggregate scores for a set of selected attributes of the emerging attributes.

16. The method of claim 1 wherein the theme is based on a set of emerging attributes.

17. A computer program product embodied in a non-transitive computer-readable medium including instructions that when executed cause one or more processors to:
- identify a starting point and a destination point for travel by a user including any constraints of the user regarding the travel;
- determine one or more initial routes between the starting point and the destination point;
- for each initial route, segment the route into a plurality of segments based on one or more criteria; and
- determine attribute oriented routes using the segments including:
  - determine one or more entities associated with each segment;
  - identify attributes for each determined entity;
  - aggregate and rank the attributes along all the determined initial routes and determine one or more emerging attributes, wherein aggregating and ranking the attributes along all the determined routes and determining one or more emerging attributes comprises accumulating the attributes, evaluating the accumulated attributes to determine top attributes for entities along the determined routes, and identifying the emerging attributes from the determined top attributes;
  - determine one or more attribute oriented routes based on the emerging attributes including identifying a theme for an attribute oriented route based on one or more of the emerging attributes, identifying a set of entities from the determined entities that are associated with the one or more emerging attributes, and creating the attribute oriented route that passes through a region that includes the set of entities; and
  - provide at least one attribute oriented route and information related to the theme to a device associated with the user.

18. The computer program product of claim 17 wherein identifying includes receiving the starting point, destination point and constraints, and wherein the constraints include limitations that affect a choice of the attribute oriented route.

19. A system, comprising:
- one or more processors; and
- one or more memory elements including instructions that, when executed, cause the one or more processors to:
  - identify a starting point and a destination point for travel by a user including any constraints of the user regarding the travel;
  - determine one or more initial routes between the starting point and the destination point;
  - for each initial route, segment the route into a plurality of segments based on one or more criteria, wherein segmenting the route comprises locating one or more intermediary points along the route in accordance with the criteria, each intermediary point representing an end of one segment and a beginning of a new segment; and
  - determine attribute oriented routes using the segments including:
    - determine one or more entities associated with each segment, wherein determining one or more entities associated with each segment comprises, for each intermediary point, determining one or more entities in an area around a given intermediary point;
    - identify attributes for each determined entity;
    - aggregate and rank the attributes along all the determined initial routes and determine one or more emerging attributes;
    - determine one or more attribute oriented routes based on the emerging attributes including identifying a theme for an attribute oriented route based on one or more of the emerging attributes, identifying a set of entities from the determined entities that are associated with the one or more emerging attributes, and creating the attribute oriented route that passes through a region that includes the set of entities; and
    - provide at least one attribute oriented route and information related to the theme to a device associated with the user.

20. The method of claim 19, wherein determining one or more entities in an area includes determining one or more entities in a radius around the intermediary point.

21. The method of claim 20, wherein determining the entities in an area includes performing a geographical search around starting and end points for each segment.

22. A computer-implemented method to provide attribute oriented routes and related theme information, comprising:
- identifying, by one or more computing devices, a starting point and a destination point for travel by a user including any constraints of the user regarding the travel;
- determining, by the one or more computing devices, one or more initial routes between the starting point and the destination point;
- for each initial route, segmenting, by the one or more computing devices, the route into a plurality of segments; and
- determining, by the one or more computing devices, attribute oriented routes using the segments including:
  - determining, by the one or more computing devices, one or more entities associated with each segment;
  - identifying, by the one or more computing devices, attributes for each determined entity;
  - aggregating and ranking, by the one or more computing devices, the attributes along all the determined initial routes and determining one or more emerging attributes;
  - determining, by the one or more computing devices, one or more attribute oriented routes based on the emerging attributes and including identifying a theme for an attribute oriented route based on one or more of the emerging attributes, identifying a set of entities from the determined entities that are associated with the one or more emerging attributes, and creating the attribute oriented route that passes through a region that includes the set of entities; and
  - providing, by the one or more computing devices, at least one attribute oriented route and information related to the theme to a device associated with the user.

* * * * *